United States Patent [19]

Plante

[11] 4,327,495

[45] May 4, 1982

[54] VANE AIRFOIL METHOD AND APPARATUS

[75] Inventor: Robert Plante, Irving, Mass.

[73] Assignee: The L. S. Starrett Company, Athol, Mass.

[21] Appl. No.: 76,772

[22] Filed: Sep. 18, 1979

[51] Int. Cl.³ ............................ G01B 5/20; G01B 5/26
[52] U.S. Cl. .............................. 33/174 C; 29/156.8 R; 33/174 PA
[58] Field of Search .......... 33/174 C, 174 L, 174 PA; 29/156.8 R, 156.8 B

[56] References Cited

U.S. PATENT DOCUMENTS

| | | | |
|---|---|---|---|
| 2,854,756 | 10/1958 | Aller | 33/174 PA |
| 2,878,574 | 3/1959 | Polk et al. | 33/174 PA |
| 2,880,516 | 4/1959 | Tandler | 33/174 PA |
| 2,909,842 | 10/1959 | Aller | 33/174 C |
| 3,115,711 | 12/1963 | Plante | 33/174 L |
| 3,163,942 | 1/1965 | Rowland | 33/174 C |
| 3,464,119 | 9/1969 | Griggs | 33/174 C |
| 3,627,997 | 12/1971 | Samuels et al. | 33/174 C |
| 3,757,424 | 9/1973 | Palmenberg | 33/174 C |
| 3,832,784 | 9/1974 | Samuels et al. | 33/174 C |
| 3,909,157 | 9/1975 | Wachtell et al. | 29/156.8 R |
| 3,959,886 | 6/1976 | Griggs | 33/174 C |
| 4,024,646 | 5/1977 | Griggs | 33/174 P |
| 4,222,172 | 9/1980 | Mason | 33/174 C |

Primary Examiner—Richard R. Stearns
Attorney, Agent, or Firm—Kenway & Jenney

[57] ABSTRACT

A staging fixture for holding a single vane nozzle assembly in a predetermined position enables characterization of the effective throat area of the nozzle assembly. The fixture has a holding element for supporting the assembly in a central position, mechanical structure for locating the assembly in the holding element, a first reference surface structure having a first reference surface in opposed juxtaposition to the central position, and a second reference surface structure having a second reference surface in opposed juxtaposition to the central position and on a side opposite to that of the first reference surface. Open area measurements made with a standard reference vane element provide alignment or calibration measurements whereby leading and trailing "half areas" of a single vane airfoil assembly can be determined. An automated selection and vane retrieval method and apparatus provide for the automatic retrieval of the vanes from known storage locations and the assembly of the nozzle to provide specified total area and uniform air flow across the entire nozzle and circumference.

21 Claims, 8 Drawing Figures

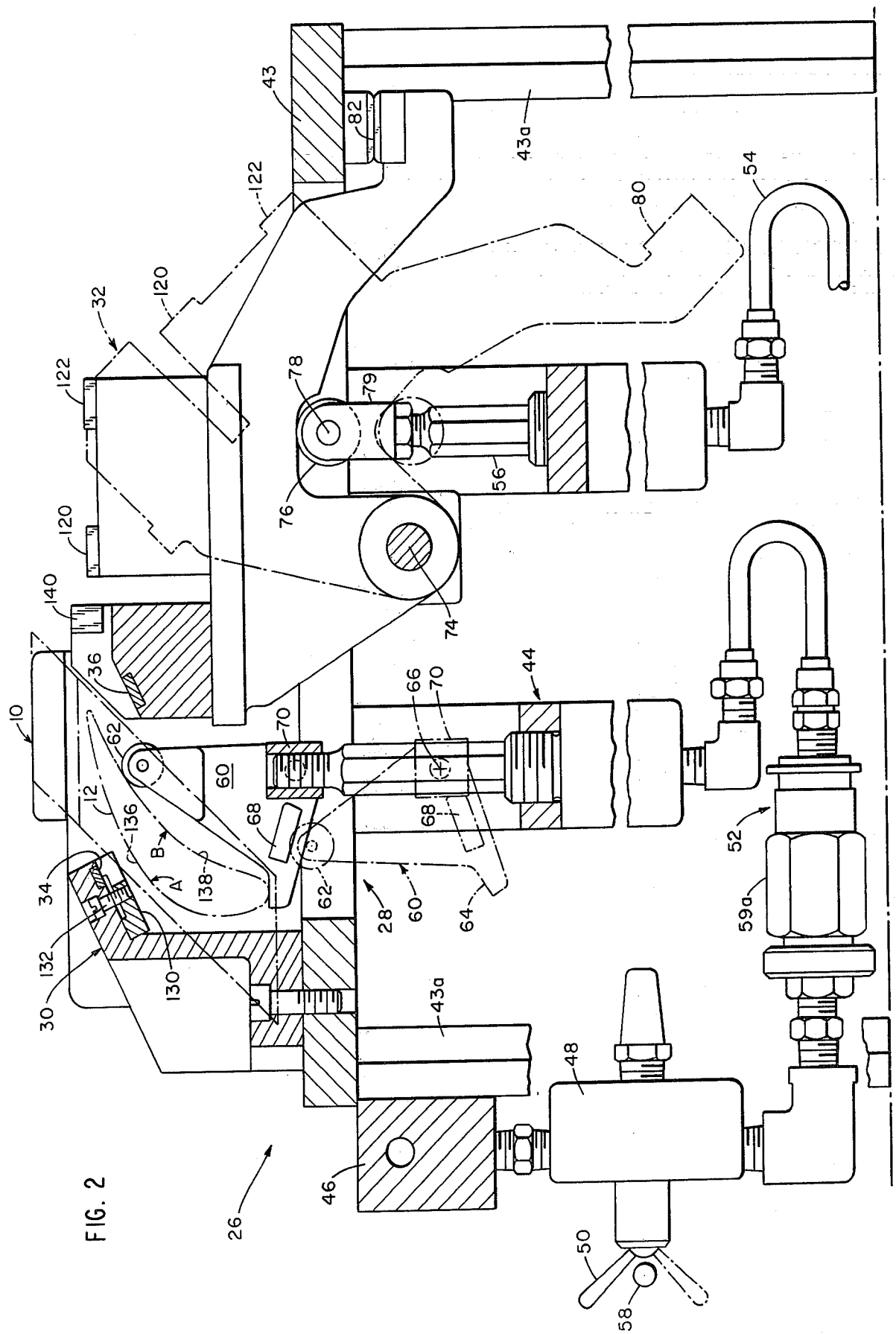

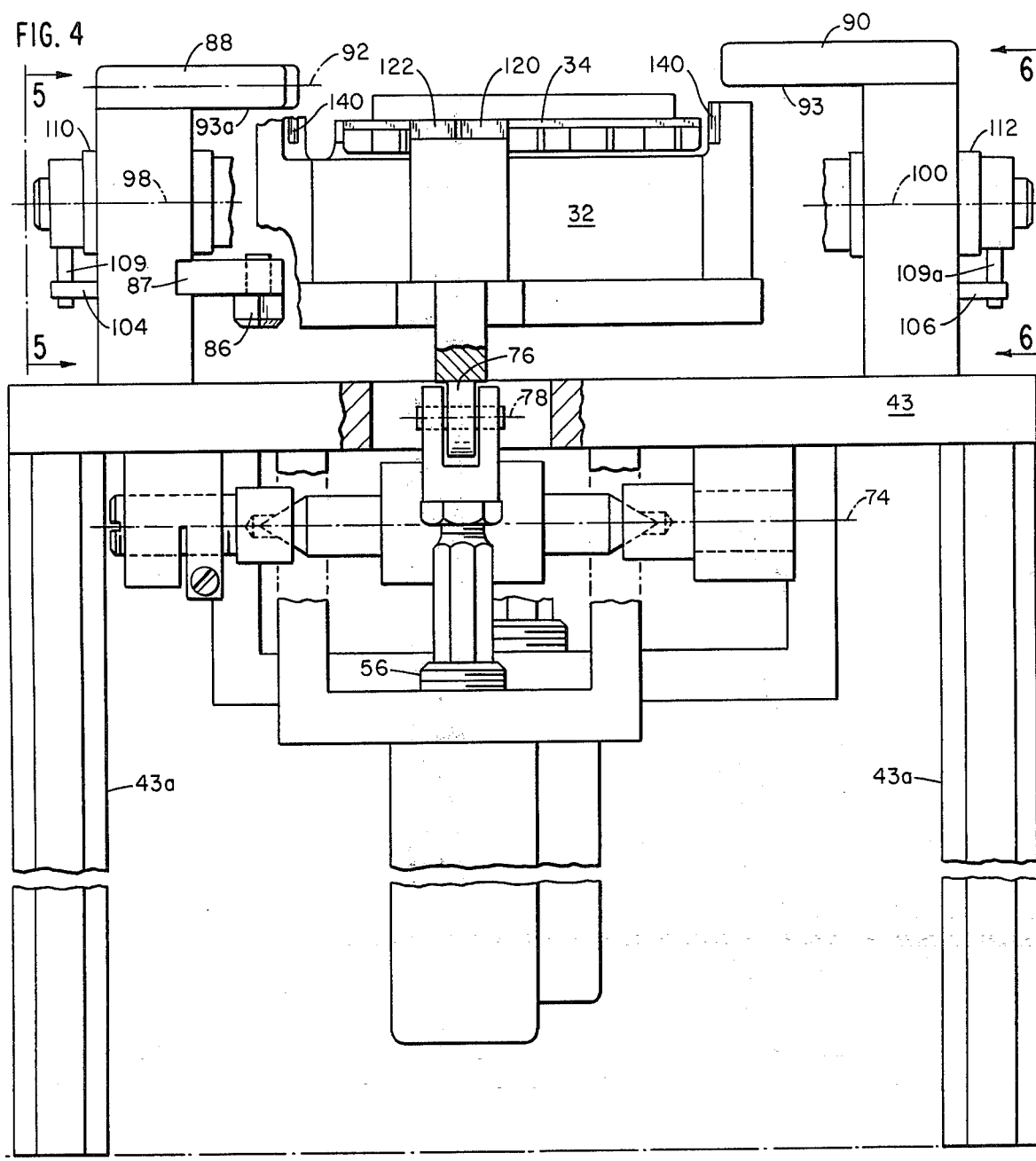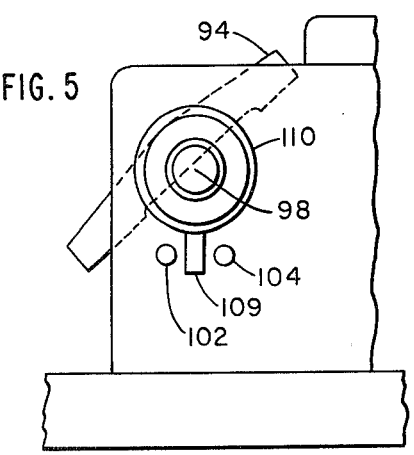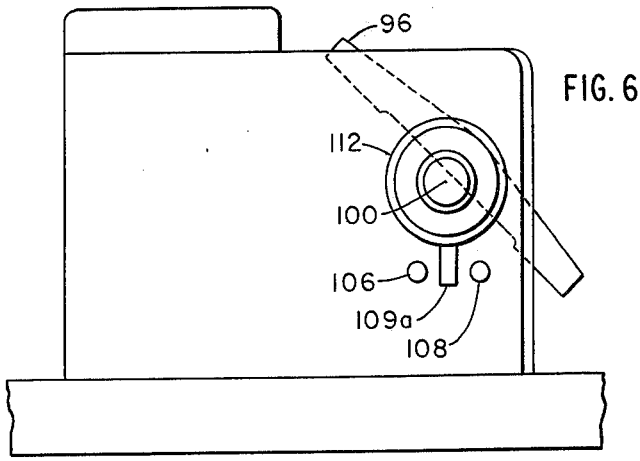

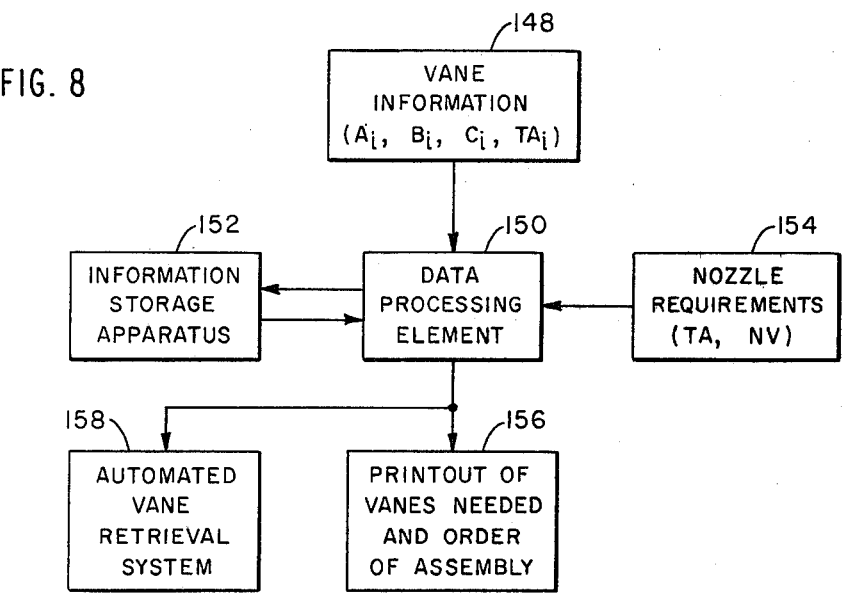

VANE AIRFOIL METHOD AND APPARATUS

BACKGROUND OF THE INVENTION

The invention relates generally to gas turbine engines and in particular to methods and apparatus for measuring, selecting, and assembling the nozzle assemblies for the nozzle in a turbine engine.

The nozzle flow area of a turbine engine and the distribution of gases around the nozzle are important parameters which affect the efficiency and operation of the turbine engine. The closer the air flow area is to the manufacturer's specifications and the more uniform the air flow is around the circumference of the nozzle, the more apt is the engine to perform reliably and efficiently. In particular, the engine is more likely to achieve a lower fuel consumption, which translates into significant fuel savings for both the engine user and the country.

During normal use, various parts of the engine must be either maintained, repaired, or replaced. In particular, in connection with the nozzle structure, one or more of the partial nozzle assemblies which form the completed nozzle will be reconditioned, replaced, or repaired, and proper maintenance of the nozzle is particularly important because the dimensional tolerances are very small. However, when a nozzle is first manufactured, or when one or more nozzle partial assemblies are removed from the nozzle structure for reconditioning, repair, or replacement, the worker who constructs or reconstructs the nozzle has the significant problem of meeting the small dimensional tolerances specified by the manufacturer with nozzle assemblies in which very small changes in vane airfoil orientation can effect relatively large changes in gas flow area. To aid him with his task, several devices have been employed.

The most reliable and accurate practical device for aiding in the construction or reconstruction of the turbine nozzle is the open area comparison gage described and claimed in Plante, U.S. Pat. No. 3,115,711, assigned to the assignee of this invention. The disclosure of U.S. Pat. No. 3,115,711 is incorporated herein by reference. This gage provides a measure of the mechanical open area between two adjacent, juxtaposed vane airfoils and the resultant readings accurately describe the effective nozzle flow area or throat area between the two vane airfoils being measured. This open area measurement correlates directly to the "class" of the vane airfoils being measured and provides the worker in the field or at the manufacturing facility with precise information useful in predicting how the turbine nozzle will function.

However, the commercial use of the open area comparison gage, which is manufactured commercially by the assignee of this invention, The L.S. Starrett Company, has been limited to those circumstances wherein the user has two or more vane airfoils in juxtaposition so that measurements may be made between them. The vane airfoils can be joined together as an integral unit (hereinafter designated a multi-vane airfoil assembly) or each vane airfoil can itself be a separate element (hereinafter designated a single vane airfoil assembly). The measurements can be made, for example, in a specially designed staging fixture for holding a multi-vane assembly, or the measurements may be made in a fixture which corresponds to a full (or partial) circumference of the turbine engine. In either case, so long as the open area measurements meet the design specifications set by the manufacturer, the end user is certain to have a resulting turbine nozzle which performs satisfactorily and reliably.

As single vane airfoil assemblies are more often adopted for use in turbine engines, there has arisen an increasing requirement to characterize in some manner a vane airfoil assembly having one vane. Generally, the requirement has been met, when open area measurement is employed, by placing two single vane assemblies in a butt-to-butt relationship and the open area between the two vanes is measured with the open area comparison gage noted above. Thereafter, one of the vanes is removed, the remaining vane is moved to the position previously occupied by the first (now removed) vane, and a new vane is inserted into the fixture in order to find a satisfactory "new vane" which meets the required specifications. While this method produces a satisfactory and reliable turbine nozzle, it is tedious and time consuming.

In addition to the present apparatus and methods for characterizing vane airfoil assemblies, there is to date no satisfactory automated method for constructing a turbine nozzle for the plurality of partial nozzle assemblies. Each partial assembly can have one or more vane airfoils. An automated process and system would not only reduce the costs of manufacturing and refurbishing the engine turbine nozzles, but would provide the end user and the original equipment manufacturer with a simplified method of forming the turbine nozzle assemblies at minimum cost and with high operating performance and reliability.

It is therefore a principal object of this invention to provide an apparatus and method for characterizing the effective throat area of a partial nozzle assembly, having one vane airfoil. A further primary object of the invention is to provide an automated method and apparatus for assembling a turbine nozzle assembly from a plurality of previously measured partial nozzle assemblies to achieve a required total area and uniform gas flows. Other objects of the invention are a method and apparatus for constructing a turbine nozzle or a portion of a turbine nozzle which is simple, highly reliable, and which preferably employs the open area comparison gage described and claimed in U.S. Pat. No. 3,115,711.

SUMMARY OF THE INVENTION

The invention relates to an apparatus for characterizing the effective throat area of a partial nozzle assembly having one vane airfoil. The apparatus features a staging fixture for holding the single vane nozzle assembly in the predetermined position. The fixture has a holding structure for supporting the assembly in a central position, a first reference surface structure having a first reference surface in opposed juxtaposition to the central position and a second reference surface structure having a second reference surface in opposed juxtaposition to the central position and on a side opposite to that of the first reference surface. The staging fixture further features mechanical structure for locating the nozzle assembly in the holding structure. Thereby, open area measurements made with a standard reference vane in the predetermined position, where the standard vane has a first and a second alignment surface, provide reference open area measurements for each of the first reference surface/first alignment surface and second reference surface/second alignment surface openings.

In particular embodiments of the invention, each of the first and second surface structures has precise surface defining members and further structure for supporting the surface members in juxtaposed positions on each side of the central position. The holding structure provides a positive pressure against a concave surface of the nozzle assembly for securing the nozzle assembly in the apparatus and in the predetermined position.

The holding structure in the preferred embodiment further features a radial alignment device for aligning the partial nozzle assembly in a transverse direction and a plurality of accurately defined surface support elements, the support elements and the radial alignment device together defining the predetermined position. The holding structure further provides a compression alignment force for securing the partial nozzle assembly in the fixture, in the predetermined position.

The invention further relates to a method for generating an effective measure for classifying the partial nozzle assembly having a single vane airfoil. The method features the steps of holding the assembly in an aligned predetermined position in a staging fixture; generating a measure of a first pseudo throat open area between one surface of the vane airfoil and a first juxtaposed reference surface of the staging fixture; generating a measure of a second pseudo throat open area between the vane airfoil and a second juxtaposed reference surface of the staging fixture; and employing the generated measure to provide the effective measure of the partial nozzle assembly classification. Preferably, the method further features averaging the generated measure to provide the effective classification measure.

In a particular embodiment of the invention, the method further features the steps of maintaining a standard reference vane assembly in the predetermined position in the staging fixture; generating a first measurement of the equivalent throat area between the first reference surface and a juxtaposed first measuring surface of the standard element; generating a second measurement of the equivalent throat area between the second reference surface and a juxtaposed second reference surface of the standard element; and adjusting the first and second reference surfaces so that the first and second measurements substantially equal first and second predetermined measurement values respectively. Thereby, the staging fixture is calibrated for further measurements of the single vane airfoil assemblies.

In another aspect of the invention, a method for selecting vane airfoil assemblies from known storage locations for filling at least a partial opening in a turbine nozzle features the steps of characterizing each of the assemblies by at least two area measurements and by a storage location; storing the characterizing information in an electrical storage apparatus; selecting vane assemblies according to the open area measurement characterizing information to fill the requirement for the turbine nozzle opening; and assembling the vane assemblies of the turbine nozzle according to the selection process. Preferably, the method features further the steps of automatically retrieving the vane assemblies from the storage locations and assembling the vane assemblies in the turbine nozzle according to a selected ordering to establish a uniform gas flow across the nozzle opening.

DESCRIPTION OF THE DRAWINGS

Other objects, features, and advantages of the invention will appear from the following description of a preferred embodiment taken together with the drawings in which:

FIG. 2 is a cross-sectional view of a staging fixture according to the invention for measuring the effective throat area or nozzle flow area of a vane airfoil;

FIG. 4 is a side elevation view of the staging fixture of FIG. 2;

FIG. 5 is a side elevation view taken along lines 5—5 of FIG. 4;

FIG. 6 is a side elevation view taken along lines 6—6 of FIG. 4;

FIG. 8 is a schematic electrical representation of an automated system for selecting and assembling vane assemblies.

DESCRIPTION OF A PREFERRED EMBODIMENT

Figure 1:
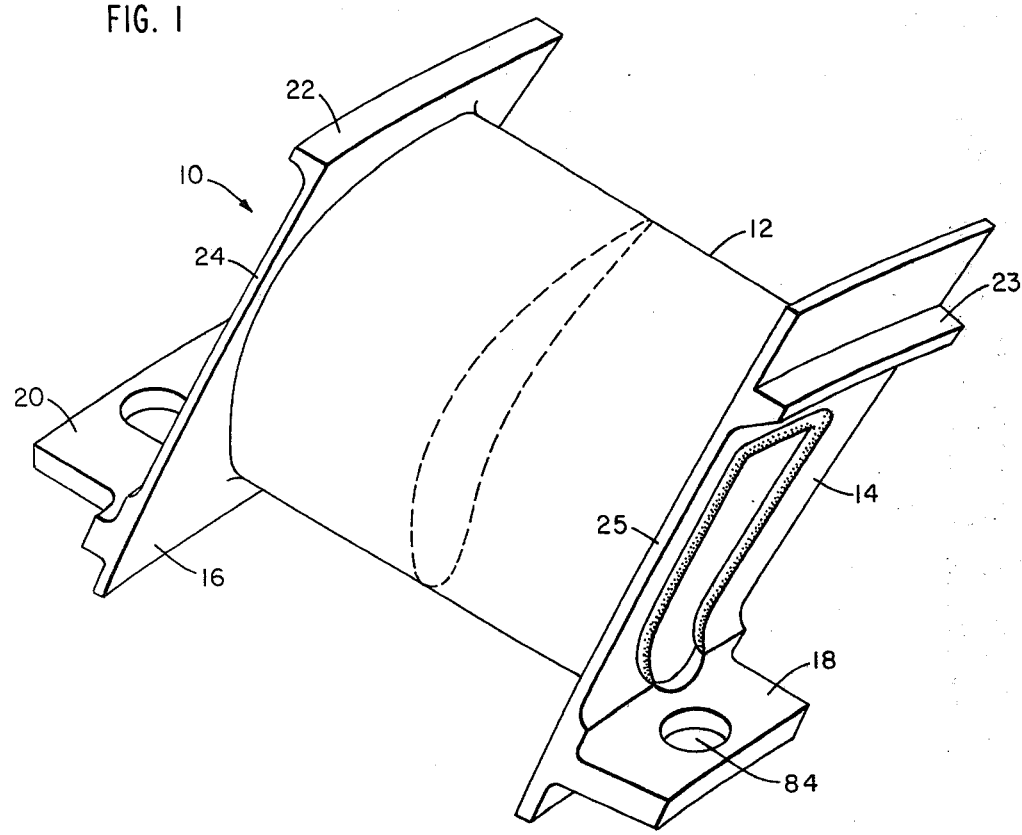
FIG. 1 is a perspective view of a typical partial nozzle assembly having a single vane airfoil.

Referring to FIG. 1, a partial turbine nozzle assembly 10 has a single vane airfoil 12 held between a vane inner buttress 14 and a vane outer buttress 16. In general, the partial nozzle assembly 10 is an integral unit, the elements thereof having been, for example, welded together, and the partial nozzle assembly has one or more vane airfoils; however for purposes of the staging fixture to be described hereinafter, partial nozzle assemblies having a single vane airfoil only are considered.

The illustrated buttresses 14 and 16 further have inner and outer tangs 18 and 20 respectively and buttress or platform rear datum surfaces 22 and 23. The buttresses 14 and 16, and in particular the datum surfaces 22, 23 in combination with circumferential pads 24, 25 provide the necessary alignment surfaces for positioning and locating the single vane nozzle assembly 10 in a central position in a staging fixture 26 (FIG. 2) for area measurement as described below.

In order to properly identify the single vane nozzle assembly, that is, in order to identify its "class", a measurement characterizing its effective throat area must be made. Typically, the nozzle assembly is placed in a butt-to-butt relationship with other nozzle assemblies; and using the open area gage described in Plante, U.S. Pat. No. 3,115,711, the throat area, that is, the area between juxtaposed vane airfoils is measured at or near the smallest area value. When a single vane nozzle assembly is being measured by itself, and a determination is required of its "class", it has not been unusual to measure the "closed area" of the vane to provide the required measure. Such measures, if properly done, are tedious and time consuming. In addition, if the measurement is performed using the commercially available "closed area" measuring gages, it is often inaccurate and unreliable, especially if the vane has been either refurbished or previously used in an engine.

Therefore, referring to FIG. 2, the staging fixture 26 provides the alignment and surface reference locations which enable the characterization of a single vane nozzle assembly to be obtained using the open area measurement technique. In general terms, the staging fixture has a central portion 28 for securing a partial nozzle assembly having a single airfoil 12 in a central predetermined alignment position. The staging fixture also has a first reference surface structure 30 and a second reference surface structure 32 which provide precisely defined reference surfaces 34 and 36 respectively. The illustrated reference surfaces 34 and 36 are positioned, in this staging fixture, at locations corresponding to the location of "ideal juxtaposed vane airfoils" so that a gage such as that described in U.S. Pat. No. 3,115,711, when inserted into the space between reference surface 34 or 36 and the vane airfoil 12, provide a pseudo throat open area reading which corresponds to a defined area between the airfoil and a hypothetical "perfect" neighboring vane airfoil. The two open area measurements which thus become available using this procedure provide an effective measure of the class of the vane airfoil and more importantly, provide measurement information characterizing the distribution of the "class" area between the two opposite (convex and concave) sides of the vane.

As an example of the use of this measurement, consider two vane airfoils labeled vane X and vane Y. According to the invention, each of the vanes is placed (separately) in the staging fixture and measurements are taken on the concave side (labelled side A in FIG. 2) and the convex side (labelled side B in FIG. 2). The resulting area measurements, $A_x, B_x$ and $A_y, B_y$ for the vanes X and Y respectively provide a complete characterization of the areas and hence of the class of the vanes. Thereafter, if the vanes are placed opposite one another in a nozzle structure so that side A of vane X is juxtaposed to side B of vane Y, the throat area between vanes X and Y would be $(A_x + B_y)/2$. Each vane can be characterized by two area measures, and preferably the measures are the "half-areas" associated with the vane, that is, one-half of the A and B areas measured by the open area gage described in U.S. Pat. No. 3,115,711. The sum of the two "half-areas", that is, the concave and the convex half-areas, provide and correlate to a measure of the classification for the vane.

Importantly, the combination of "half-areas" of adjacent vanes also provides a measure of the uniformity of the air flow distribution around an entire turbine nozzle. In many applications, this air flow distribution is found to be almost as important as the total nozzle flow area which is equal to the sum of all the half-areas, and corresponds to the sum of the classes of the vanes which are employed in the application.

In any practical application of the staging fixture 26, therefore, a method of calibrating or checking the accuracy of the fixture is essential. According to the invention, a specially prepared standard reference vane element 38 (FIG. 7) which has an overall configuration corresponding to the measured surfaces of a single vane nozzle assembly 12, is secured in the central portion of the staging fixture. The reference vane thus has specially machined surfaces 40 and 42 to provide predetermined standard area open measurements when the open area method is employed. Surfaces 40 and 42 are in juxtaposition to surfaces 34 and 36 respectively. In the illustrated embodiment, the staging fixture and reference element have positionally fixed, non-adjustable, references surfaces 34, 40 and 42, 36 which are positioned so that the measurements they provide equal predetermined selected values. The predetermined values may in other embodiments be unequal.

Referring now to FIGS. 2-6, the staging fixture 26 has a horizontal support table 43 which is supported by a plurality of vertical support legs 43a. A partial nozzle assembly 10 having a single vane 12 is located and secured in the staging fixture by the application of fluid force through a central piston assembly 44. The fluid, in the illustrated embodiment, compressed air, is provided from a manifold 46 connected to a manually operated valve assembly 48. The valve assembly is controlled by the operation of a toggle valve element 50.

When the illustrated toggle element 50 is moved to its down position, fluid becomes available through a first fluid path 52 to the central piston assembly 44. A second manually operated valve assembly (not shown) connects the manifold to a second fluid path 54 to operate a second piston assembly 56. A toggle element 57 (FIG. 3) controls operation of the second valve.

For safety reasons, a spring loaded pin or other stop member 58 extends in the path of movement of toggle element 50 in order to ensure that two hands are required to provide the compressed air to fluid path 52. Thus, one hand must be employed to manually move (by depressing pivoted arm 59) the stop member 58 away from its interfering position with element 50, while the other hand is employed to manually operate toggle element 50.

In the illustrated embodiment of the assembly, the fluid path 52 further includes a fluid velocity control element 59a which limits the velocity of the fluid as the valve assembly 48 is turned on. By reducing the velocity of fluid flow through element 59a in flow path 52, the impact of the actuated structural elements (upon the vane assembly 10 as described below) is reduced to a more acceptable level.

The actuation of toggle element 50 to its ON position, in the illustrated embodiment, causes the application of compressed air pressure to force the piston of piston assembly 44 from a lower position (shown by dot-dashed lines) to an upper position wherein the vane airfoil assembly is positionally secured and located. In its upper position, piston assembly 44 forces a structural holding member 60 against the airfoil assembly. Structural member 60 has two freely rotating support wheel elements 62 which engage the concave underside of the vane airfoil 12. In addition, the structural member 60 has a bottom support surface 64 for applying a vertically upward force against the bottom of the vane airfoil assembly 10 and in particular against the vane airfoil 12 itself. As described in detail below, in its located or aligned position, the vane airfoil assembly is located by a three point (or surface) alignment.

Structural member 60 in its lower position, that is, when hydraulic pressure is not applied to piston assembly 44, rotates about a pivot axis 66 in a counterclockwise direction until a projecting stop member 68 engages a cross support member 70. As a result of this structural interference, the counterclockwise movement of member 60 is terminated. In operation, as pressure is applied to piston assembly 44, the rollers 62 first engage the underside concave surface portion of the vane airfoil near the leading (bottom) edge, and roll along the underside concave surface, forcing the vane laterally upward. At a later time, bottom surface 64, which has been rotated clockwise by the movement of rollers 62 and translated upward into position by piston assembly 44, contacts and applies a strong vertical upward force on vane airfoil 12 and hence on assembly 10.

The reference surface supporting structure 32 for providing surface 36 in its precisely aligned position pivots about an axis 74 between an operative position, in which surface 36 is in aligned juxtaposition to vane 12, and a spaced apart inoperative position (shown in dot-dashed outline in FIG. 2) clockwise of its operative position in the illustrated embodiment, wherein the vane airfoil assembly 10 can be inserted into or removed from the apparatus. The rotational movement of the second reference surface structure 32 is controlled by the fluid pressure in the second hydraulic path 54, that is, by the actuation of piston assembly 56. A roller 76, mounted for free rotational movement about axis 78, is secured to one end of a shaft 79 adapted for vertical translation by the piston assembly. When the piston assembly is in its relaxed or inoperative downward position, the reference surface structure 32 pivots clockwise around axis 74 (by its own weight) to an inoperative position as shown in dot-dashed outline in FIG. 2. When toggle element 57 is operated to its ON position, the piston and rod of piston assembly 54 move upward, translating roller 76 upward to pivot the reference surface structure 32 clockwise until reference alignment surface 80 engages and stays in intimate contact with reference alignment surface 82. Alignment surfaces 80 and 82 are each precisely machined surfaces, for example carbide steel. In this clockwise position, the second reference surface structure is in its operative position.

The vane airfoil assembly 10 is located in the staging fixture by forcing the buttress members 14, 16 into contact with alignment elements of the fixture. For the illustrated vane member of FIG. 1, radial alignment is attained by passing a radial alignment element through a circular opening 84 of the inner tang 18. In the illustrated embodiment of the invention, the radial alignment element corresponds to a diamond shaped pin 86 (FIGS. 3 and 4) which extends downward from a support element 87.

The vane airfoil assembly is located in the vertical direction by the engagement of buttress rear datum surfaces 22, 23 respectively with stops 88, 90 respectively. Stop 90 is a fixed alignment stop and stop 88 is arranged to structurally pivot about an axis 92 so that if twisting of the vane airfoil assembly occurs, the stop 90 provides a positive vertical reference surface 93 while the stop 88 provides a pivoting support surface 93a.

The vane airfoil assembly is supported against horizontal movement around pin 86 by pivoting circumferential stop elements 94 and 96. These elements freely pivot, within limits, around axes 98 and 100 respectively and the allowable amount of pivotal movement is restricted by stop pins 102, 104 and 106, 108 respectively. Stop pins 102, 104 and 106, 108 limit the rotational movement of rotatable support structure 110, 112 by limiting the movement of extension pins 109, 109a attached thereto. The rotatable support structures 110, 112 carry, at inner ends thereof, the pivoting circumferential stop elements 94, 96 respectively. Thus, pivoting circumferential stop elements 94 and 96 receive, align with, and engage circumferential pads 25, 24 respectively of the airfoil vane assembly when the assembly is secured by structural member 60.

As noted, the vane airfoil assembly is properly located or seated by the upward and lateral forces applied by structural member 60. This loading substantially and advantageously approximates the loading of vane assembly in an operating engine wherein turbine gases enter the nozzle in what corresponds in the illustrated embodiment to a substantially vertical upward direction (as the vane appears in FIG. 2) and exits then in a substantially horizontal direction. It is the particular loading provided by structural member 60 which in part enables the accurate and reliable results which are attained by the disclosed staging fixture in combination with an open area gage such as that shown in U.S. Pat. No. 3,115,711.

The illustrated staging fixture is particularly structured to operate with and receive the open area gage described and claimed in U.S. Pat. No. 3,115,711. Thus, the second reference surface supporting structure 32 has precision supporting pads 120, 122 which are preferably carbide steel for supporting the rest feet of the open area gage of U.S. Pat. No. 3,115,711 during area measurement operations. Similarly, the supporting structure 30 has foot pads 124, 126 which provide precisely aligned edge surfaces for the feet of the open area gage of U.S. Pat. No. 3,115,711 when it is measuring the trailing blade open area between reference surface 34 and vane 12.

The illustrated measurement surfaces 34 and 36 are elongated strip materials, preferably a precision machined carbide steel, secured in position in any of a number of satisfactory methods known to those practiced in the art. Alternatively, a plurality of separate surface members could be employed to replace the illustrated strips so long as they align with the measurement probes of the open area gage being used.

In particular, illustrated measurement strip 34 is a carbide steel member having precisely machined edge portions and which is held in place by a clamping structure which includes a clamp member 130. Clamp 130 is maintained in a secured position by screws 132. Preferably, as operative portions of the surface of strip 34 wear, the surface can be rotated, either end for end or about its longitudinal axis to provide additional wear surfaces without the requirement of replacing the strip material each time.

Figure 7:
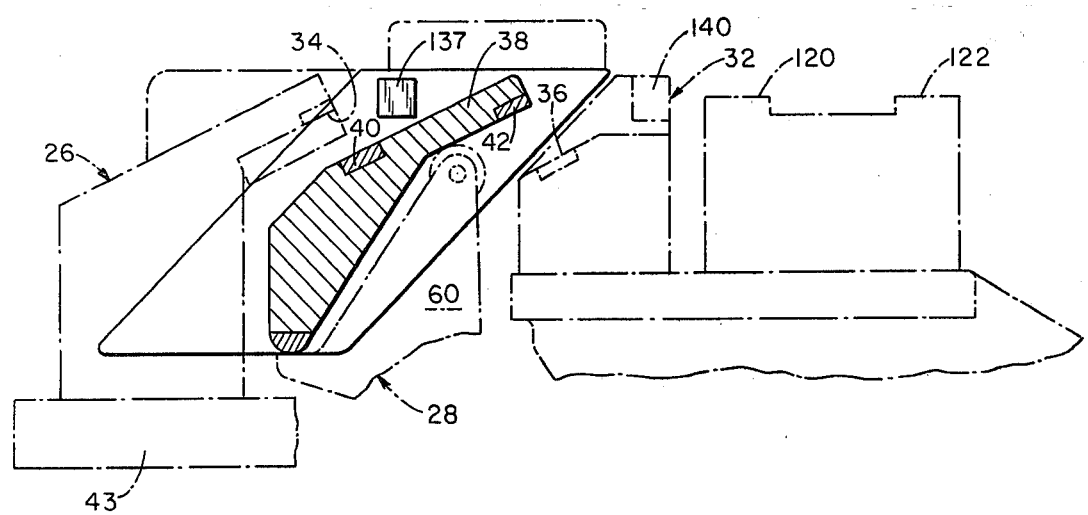
FIG. 7 is a partial schematic view of a portion of the staging fixture holding a standard reference vane assembly according to the invention.
Figure 3:
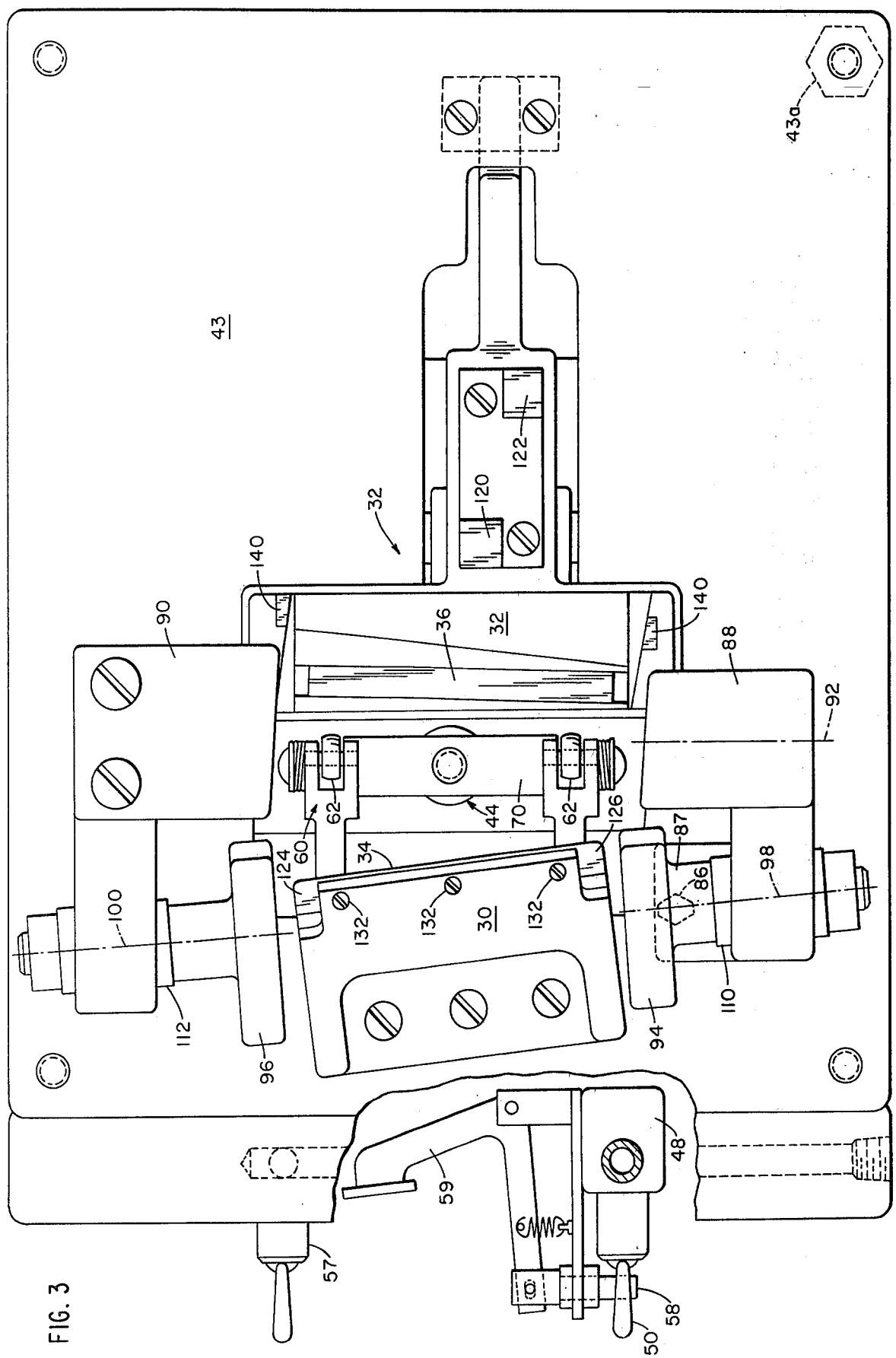
FIG. 3 is a top plan view of the staging fixture of FIG. 2.

In operation therefore, a vane assembly is located and secured in the apparatus and an open area gage is placed between the convex surface 136 (the A surface) and the measurement surface 34 to measure the throat area therebetween. This defines a first pseudo throat area measurement, A. In this position, the open area gage measures the length of the vane as the distance between the buttress elements of vane assembly 10. (When the reference vane assembly 38 is measured, two length reference surfaces 137 (only one is shown in FIG. 7) define the predetermined distance between the buttresses.)

The open area gage is thereafter inserted between the concave surface 138 (the B surface) of the vane 12 and the measurement surface 36. Since, for the open area gage of U.S. Pat. No. 3,115,711, the previous open area measurement will have taken into account the distance between buttress surfaces, precision surfaces 140 are provided on structure 32 to implement a standard predetermined length so that vane length does not contribute twice to the open area measurement. The result is the B area measurement. The sum of the A and B area measurements, divided by two, provides a measure of the class of the vane airfoil assembly being measured.

By using the apparatus described herein, each single vane assembly can be characterized by a total area, separate areas (or half areas) at the leading and trailing sides of the vane, and/or by the class of the vane as determined by the measurements. Thereby, according to the invention, a single vane airfoil assembly can be classified by both class (or total area) and by its "half areas", and this information describing the vane can be stored and accessed at a later time as needed. According to the invention, an automated assembly system can then be constructed to provide a turbine nozzle having not only the required total flow area (the primary requirement) but a uniformly distributed gas flow around the circumference of the nozzle.

In the automated method and apparatus for assembling a turbine nozzle, each vane assembly, which can include more than one vane airfoil, is characterized by at least two area measurements. For a vane assembly of the type of FIG. 1, only two areas are needed, for example, the two half areas. Where there is more than one vane airfoil in the assembly, the half areas measured at each end of the vane assembly must be supplemented, for example by a total area measurement. Thus, each vane assembly generally has associated with it at least two half areas $A_i$ and $B_i$ and where there is more than a single vane airfoil in the assembly, a total area measure, $TA_i$.

In addition, each of the vanes is stored in a storage apparatus. The vanes can be stored in any of a variety of ways, for example, vane assemblies of similar area measurements can be grouped together in the same storage bin. Preferably, however, each vane assembly is uniquely assigned to a storage bin or location. In either case, the vane is assigned a storage location number $C_i$.

Thereafter, when a nozzle requirement is specified, and generally, the requirement will be specified by the total area requirement for a specified number of vane airfoils, the individual assembling the nozzle can refer to a printed listing of the area characteristics of the available vane assemblies (each assembly can also have designated thereon the area characteristics) and manually select the vane airfoil assemblies having the required total area. In addition, he may attempt to provide a uniform gas flow around the nozzle circumference by paying close attention to the half area values.

Referring to FIG. 8, in an automated binning or vane retrieval apparatus and method, the vane assembly area and storage location information relating to each vane airfoil assembly (available at 148 which may be, for example, a keyboard input) are provided as data inputs to a data processing element 150 and are stored by the processing element as electrical signals in an electrical information storage apparatus 152. When a nozzle requirement, described by the total nozzle area $TA_N$ and the total number of vanes, NV (available at 154, for example a punched card or tape input) is received, the data processing element automatically searches the information storage apparatus and generates an appropriate grouping of vane assemblies which meets the nozzle requirement. The data processing element then provides that information as a printout (as 156) for the end user to read and study, and preferably also operates an automated mechanical vane retrieval system 158 which pulls or retrieves the selected vane assemblies from the specified storage locations or bins. Importantly, by employing the automated data processing element 150, the vanes which are specified can satisfy not only the total area requirement, but in addition can be selected by the processing element to satisfy the secondary, yet still important, requirement that the gas flow through the vanes be uniform around the nozzle circumference. This condition is achieved by matching not only the specified total areas, but also the half areas so that adjacent vanes have an open area which is substantially equal to the open area of all other adjacent vanes. Therefore, the printout at 156 provides, in addition to the designation of the vanes, the order in which the vanes are assembled; and the automated vane retrieval system 158 preferably retrieves the vanes in the specified order in which they are to be assembled.

In the preferred embodiment of the invention, the data processing element is most generally and preferably an appropriately programmed digital computer. On the other hand however special purpose hardware can be built to implement this same function.

It will be obvious to those practiced in the art that other embodiments of both the staging fixture and the automated vane selection and retrieval system are obvious in view of the disclosed embodiment. Therefore, additions, subtractions, deletions, and other modifications of the disclosed preferred embodiment of the invention will be apparent to those skilled in the art and are within the scope of the following claims.

What is claimed is:

1. Apparatus for characterizing the effective throat area of a partial nozzle assembly having one vane airfoil, said vane airfoil having a concave fluid deflecting surface and a convex fluid deflecting surface, comprising a staging fixture for holding said single vane nozzle assembly in a predetermined position, said fixture having holding means for supporting said assembly in a central position, a first reference surface structure having a first reference surface in opposed juxtaposition to one of said deflecting surfaces and corresponding in direction and position to the location of a succeeding vane airfoil, a second reference surface structure having a second reference surface in opposed juxtaposition to said other deflecting surface and corresponding in direction and position to the location of a preceding vane airfoil, and means for locating said nozzle assembly in said holding means, whereby open area measurements made with a standard reference vane element in said predetermined position, said reference element having first and second alignment surfaces corresponding respectively to said deflecting surfaces, characterize the effective throat area of said reference vane, said reference open area measurements for each of said first reference surface/first alignment surface and said second reference surface/second alignment surface being made between the reference surface and the juxtaposed alignment surface.

2. The apparatus of claim 1 wherein each of said first and second surface structures comprises a precise surface defining element, and means for supporting said surface element in said juxtaposed position on a said side of said central position, and said holding means provides a positive pressure against the concave surface of said vane airfoil for securing said nozzle assembly in said apparatus in said predetermined position.

3. The apparatus of claim 2 wherein at least one of said surface defining elements has a plurality of precision measuring surfaces, and said surface element supporting means has a clamping structure for securing said surface defining element in a plurality of operative positions, whereby said plurality of precision measuring surfaces of said surface defining element can be employed.

4. The apparatus of claim 1 wherein said locating means comprises
a plurality of accurately defined surface support elements for engaging selected surfaces of said nozzle assembly,
radial alignment means for aligning said partial nozzle assembly in a transverse direction, said support elements and said radial alignment means together defining said predetermined position, and
said holding means provides a compression alignment force for securing said partial nozzle assembly in said fixture in said predetermined position.

5. The apparatus of claim 4 wherein said radial alignment means comprises a protrusion element for engaging a protrusion receiving aperture in a platform portion of said nozzle assembly.

6. The apparatus of claim 1 wherein one of said first and second reference surface structures pivots between an operative position adjacent said central position and an inoperative position spaced away from said central position,
wherein a said nozzle assembly can be inserted into said apparatus at said central position only when said pivoting surface structure is in its inoperative position.

7. The apparatus of claim 6 further comprising
a fluid actuated element for maintaining said pivoting element in its operative position, and
means for controlling the pressure of fluid applied to actuate said fluid element.

8. The apparatus of claim 1 wherein said holding means comprises
a structural assembly pivotable about a central axis, said structural assembly being movable between an operative position for securing said nozzle assembly in said predetermined position and an inoperative position wherein said nozzle assembly is free to move,
said structural assembly having
an upper roll, free to turn on its axis, for engaging a concave surface portion of said nozzle assembly in its operative position,
a lower surface contacting portion for contacting a bottom surface portion of the vane of the nozzle assembly when the structural assembly is in its operative position, and
said upper roll first contacting said nozzle assembly vane when said structural assembly moves from its inoperative to its operative position and said roll-vane contact tending to rotate said lower surface into its operative alignment relationship with the vane.

9. The apparatus of claim 8 further comprising
a hydraulic powering structure for controlling the operation of said structural assembly,
said structure comprising
a fail-safe actuation control unit which requires two simultaneous manual actuating movements, and
means for controlling the starting velocity of fluid flow when said unit is actuated to an operative position.

10. The apparatus of claim 1 wherein said locating means comprises
a first fixed bottom surfaced stop member for engaging an upper surface of a nozzle assembly buttress,
a first pivotable bottom surfaced stop member for engaging an upper surface of another nozzle assembly buttress, and
a first and a second pivotal circumferential stop member for engaging the upper circumferential pads of said nozzle assembly buttresses.

11. The apparatus of claim 10 further comprising
means for locating said nozzle assembly in a radial direction.

12. Apparatus for characterizing the effective throat area of a partial nozzle assembly having one vane airfoil comprising
a staging fixture for holding said single vane nozzle assembly in a predetermined position, said fixture having
a holding element for supporting the assembly in a central position, said holding element having
a structural assembly pivotable about a central axis, said structural assembly being moveable between an operative position for securing the nozzle assembly in said predetermined position and an inoperative position wherein said nozzle assembly is free to move, said structural assembly applying pressure against a concave surface of said nozzle assembly in said operative position,
a first reference surface structure having a first reference surface in opposed juxtaposition to said central position, said first surface structure having
a first precise surface defining element, said element having a plurality of precision measuring surfaces, and
means for supporting the surface element in the juxtaposed position and for clamping said surface defining element in one of a plurality of operative positions,
a second reference surface structure having a second reference surface in opposed juxtaposition to said central position on a side opposite to that of said first reference surface, said second reference surface structure being pivotable between an operative position adjacent to said central position and in inoperative position spaced away from said central position, and
means for locating said nozzle assembly in said holding element, said locating means comprising
a plurality of accurately defined surface support elements for engaging selected surfaces of said nozzle assembly, and
a radial alignment means for aligning said nozzle assembly in a transverse direction,
said support elements and said radial alignment means together defining said predetermined position,
whereby open area measurements made with a standard reference vane element in said predetermined position, said reference element having first and second alignment surfaces aligning in juxtaposition to said first and second reference surfaces respectively, characterize the effective throat area of said reference vane, and reference open area measurements for each of said first reference surface/first alignment surface and said second reference surface/second alignment surface are made between the reference surface and the juxtaposed alignment surface.

13. A method for generating an effective measure for classifying a partial nozzle assembly, the assembly comprising a single vane airfoil, comprising the steps of holding said assembly in an aligned predetermined position in a staging fixture, generating a first numerical measure of a first pseudo throat open area, said area being the open area between one surface of said vane airfoil and a first juxtaposed reference surface of said staging fixture, said first reference surface corresponding in direction and position to the location of a next succeeding vane airfoil, generating a second numerical measure of a second pseudo throat open area, said area being the open area between a second surface of said vane airfoil and a second juxtaposed reference surface of said staging fixture, said second vane surface being on a side of said vane opposite to said first vane surface, said second reference surface corresponding in direction and position to the location of a preceding vane airfoil, and employing said generated measures to provide said effective measure of said partial nozzle assembly classification.

14. The method of claim 13 wherein said employing step comprises the step of averaging said generated measures to provide said effective classification measure.

15. The method of claim 13 further comprising the steps of maintaining a reference vane assembly in said predetermined position in said staging fixture, generating a first measurement of an equivalent throat area between said first reference surface and a juxtaposed first measuring surface of said reference assembly, generating a second measurement of an equivalent throat area between said second reference surface and a juxtaposed second reference surface of said reference assembly, and adjusting said first and second reference surfaces so that said measurements substantially equal first and second predetermined measurement values, whereby said staging fixture is thereby calibrated for further measurements of said single vane airfoil assemblies.

16. A method according to claim 13 further comprising the steps of storing a plurality of said single vane airfoil assemblies according to the generated measures of said first and second open areas, characterizing a nozzle requirement by the number of vane airfoils needed and a total required nozzle area, and selecting said vane airfoil assemblies according to said requirements to form at least a partial turbine nozzle.

17. The method of claim 16 further comprising the step of assembling a turbine nozzle vane airfoil structure from said partial nozzle assemblies according to a determined limitation on the values of adjacent throat open area measurements, whereby a substantially uniform gas flow results across said turbine nozzle.

18. A method for selecting vane airfoil assemblies from known storage locations for filling at least a partial opening in a turbine nozzle comprising the steps of characterizing each said assembly by at least two open area measurements and a said storage location, storing the characterizing information in an electrical storage apparatus, and selecting vane assemblies according to said open area measurement characterizing information to fill the requirement for said turbine nozzle opening.

19. The method of claim 18 further including the step of assembling said vane assemblies in said turbine nozzle according to said selecting step.

20. The method of claim 18 further comprising the step of providing a selected ordering of said selected vane assemblies to establish uniform gas flow across said nozzle opening, and assembling said vane assemblies in said turbine nozzle according to said selected ordering.

21. The method of claim 20 including the step of automatically retrieving said vane assemblies from said storage locations.

* * * * *